United States Patent
Swett

(10) Patent No.: US 11,282,490 B2
(45) Date of Patent: Mar. 22, 2022

(54) DARK ACOUSTIC METAMATERIAL CELL FOR HYPERABSORPTION

(71) Applicant: Baker Hughes, LLC, Houston, TX (US)

(72) Inventor: Dwight W. Swett, Houston, TX (US)

(73) Assignee: Baker Hughes, A GE Company, LLC, Houston, TX (US)

( * ) Notice: Subject to any disclaimer, the term of this patent is extended or adjusted under 35 U.S.C. 154(b) by 677 days.

(21) Appl. No.: 16/132,405

(22) Filed: Sep. 15, 2018

(65) Prior Publication Data

US 2022/0005447 A1   Jan. 6, 2022

(51) Int. Cl.
| G10K 11/16 | (2006.01) |
| G01V 1/04 | (2006.01) |
| G01V 1/16 | (2006.01) |

(52) U.S. Cl.
CPC ............... *G10K 11/16* (2013.01); *G01V 1/04* (2013.01); *G01V 1/162* (2013.01); *G10K 2210/10* (2013.01); *G10K 2210/3219* (2013.01); *G10K 2210/512* (2013.01)

(58) Field of Classification Search
CPC .............. G10K 11/16; G10K 2210/10; G10K 2210/3219; G10K 2210/512; G01V 1/04; G01V 1/162
See application file for complete search history.

(56) References Cited

U.S. PATENT DOCUMENTS

| 4,733,380 A | 3/1988 | Havira et al. |
| 4,847,817 A | 7/1989 | Au et al. |
| 5,491,668 A | 2/1996 | Priest et al. |
| 5,930,201 A | 7/1999 | Cray |
| 6,643,221 B1 | 11/2003 | Hsu et al. |

(Continued)

FOREIGN PATENT DOCUMENTS

| WO | 2010046685 A1 | 4/2010 |
| WO | 2016018377 A1 | 2/2016 |
| WO | 2016025388 A1 | 2/2016 |

OTHER PUBLICATIONS

Moon, P et al., Field Theory Handbook, New YorK: Springer-Verlag, 1971.

(Continued)

*Primary Examiner* — David L Ton
(74) *Attorney, Agent, or Firm* — Cantor Colburn LLP

(57) ABSTRACT

Systems and methods for vibration attenuation, and for investigating a subsurface volume of interest from a borehole. System embodiments may include a vibration attenuation system, comprising: at least one vibration attenuator configured to dynamically isolate a vibration source, the at least one vibration attenuator comprising metamaterial defining a plurality of cells; wherein at least one cell of the plurality of cells comprises a plurality of sub-cells azimuthally arrayed about an axis of alignment, and at least one sub-cell of the plurality is defined by a solid, the at least one sub-cell including a plurality of cell segments substantially oriented in alignment with a mapping geometry comprising an inversion of a canonical tangent circles mapping. The vibration source may comprise an acoustic source. The system may have an enclosure having the acoustic source and the at least one receiver disposed therein, with the at least one acoustic attenuator is positioned between.

24 Claims, 9 Drawing Sheets

(56) References Cited

U.S. PATENT DOCUMENTS

| | | | |
|---|---|---|---|
| 7,206,258 B1 | 4/2007 | Fisher et al. | |
| 8,857,564 B2* | 10/2014 | Ma | G10K 11/18 |
| | | | 181/286 |
| 9,418,646 B2* | 8/2016 | Daley | G10K 11/172 |
| 10,032,445 B1* | 7/2018 | Linch | B32B 3/12 |
| 2013/0125641 A1 | 5/2013 | Chemal et al. | |
| 2015/0044467 A1 | 2/2015 | Jo et al. | |
| 2015/0218941 A1 | 8/2015 | Clarke et al. | |
| 2016/0027427 A1* | 1/2016 | Yang | G10K 11/172 |
| | | | 181/286 |
| 2016/0293154 A1* | 10/2016 | Yang | G10K 11/172 |
| 2017/0098844 A1* | 4/2017 | Barnwell | H01M 8/1058 |
| 2017/0254917 A1 | 9/2017 | Fouda et al. | |
| 2017/0268591 A1* | 9/2017 | Harne | F16F 1/3605 |
| 2018/0024265 A1 | 1/2018 | Swett et al. | |
| 2018/0080766 A1 | 3/2018 | Johnson et al. | |
| 2018/0166062 A1* | 6/2018 | Hoffberg | H04K 3/00 |
| 2020/0043456 A1* | 2/2020 | Zhang | G10K 11/161 |

OTHER PUBLICATIONS

Mei, J., et al., "Dark acoustic metamaterials as super absorbers for low-frequency sound," Nature Communications, pp. 1-7, Mar. 2012.

PCT/US17/42563 International Search Report dated Nov. 28, 2017.

\* cited by examiner

Tangent Circles Curvilinear Contours

Inverted Tangent Circles Curvilinear Contours

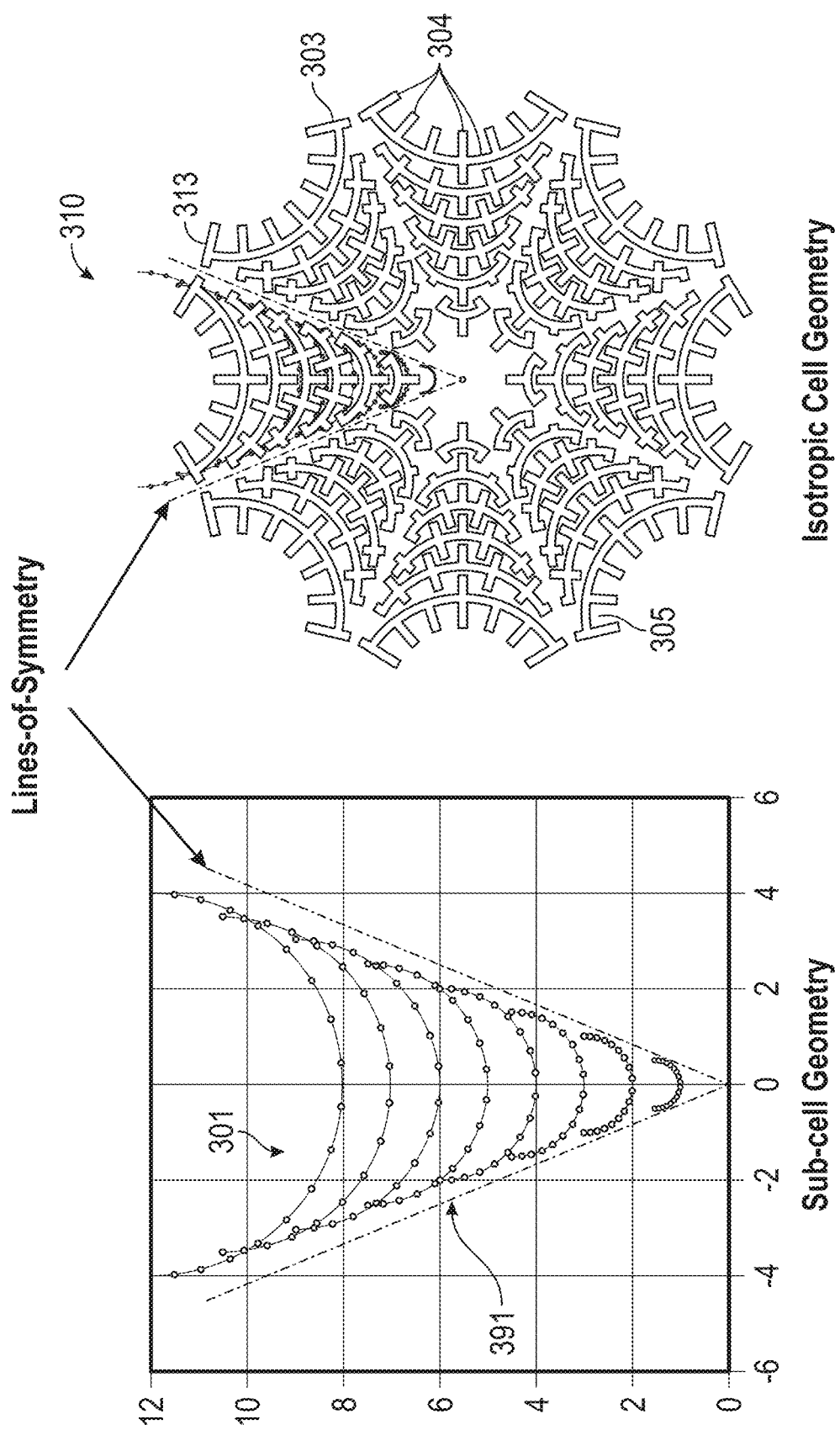
FIG. 3B Isotropic Cell Geometry
FIG. 3A Sub-cell Geometry

Acoustic Intensity [W/m²]

Acoustic Pressure [Pa]

DARK ACOUSTIC METAMATERIAL CELL FOR HYPERABSORPTION

FIELD OF THE DISCLOSURE

This disclosure relates to vibration attenuation systems, which may include a vibration attenuation material, such as acoustic materials, and methods of making and using such materials, including in connection with sensors in various tools, such as acoustic logging tools.

BACKGROUND OF THE DISCLOSURE

Downhole acoustic logging tools, which are used to investigate subsurface features, can include one or more acoustic transmitters or sources and a number of acoustic receivers. These tools may also include a transceiver that can function as a transmitter and a receiver. In either case, the transmitters emit acoustic energy into the subsurface environment surrounding the wellbore. The acoustic signals are reflected by interfaces associated with the wellbore, well structures, and/or the formation. The reflected acoustic signals are detected by the receivers in the logging tool and processed to provide estimates of one or more properties of the wellbore, well structures, and/or the formation. The present disclosure provides for an acoustic attenuator, and for acoustic sensors that utilize an acoustic attenuator.

SUMMARY OF THE DISCLOSURE

Aspects of the present disclosure include apparatus, systems, and methods for vibration attenuation. Aspects of the present disclosure may include apparatus, systems, and methods for investigating a subsurface volume of interest from a borehole. System embodiments may include a vibration attenuation system, comprising: at least one vibration attenuator configured to dynamically isolate a vibration source, the at least one vibration attenuator comprising metamaterial defining a plurality of cells; wherein at least one cell of the plurality of cells comprises a plurality of sub-cells azimuthally arrayed about an axis of alignment, and at least one sub-cell of the plurality is defined by a solid, the at least one sub-cell including a plurality of cell segments substantially oriented in alignment with a mapping geometry comprising an inversion of a canonical tangent circles mapping.

The at least one sub-cell may include a plurality of cell segments with at least a majority of cell segments of the plurality comprising at least one arcuate section and at least one radial section. In some implementations all of the cell segments may include at least one arcuate section. The vibration source may comprise an acoustic source. The system may include the acoustic source and at least one receiver configured to receive acoustic signals caused by the acoustic source. The system may include an enclosure configured for conveyance along a borehole, the enclosure having the acoustic source and the at least one receiver disposed therein; wherein the at least one acoustic attenuator is positioned between the acoustic source and the at least one receiver in the enclosure. The at least one receiver may be configured to receive acoustic signals resulting from an interaction of a volume of interest with acoustic source signals generated from the acoustic source.

At least a majority of cell segments of the plurality may each comprise a plurality of arcuate sections. In some implementations almost all or all of the cell segments may include a plurality of arcuate sections. The canonical tangent circles mapping may provide focusing constant contours of eccentric circles with a common tangent point at the origin of Cartesian coordinates, and the inversion may provide defocusing constant contours of the eccentric circles. The cells of the metamaterial may intrinsically damp incident acoustic waves. At least some cells of the at least one cell may focus incident acoustic waves to a cell interior where energy of the incident acoustic waves is dissipated by absorption. The absorption may be predominantly due to subwavelength wave scattering at metamaterial intracellular boundaries. The absorption may occur over a substantially unbounded attenuation frequency bandwidth. The mapping may focus constant contours of eccentric circles with a common tangent point at the origin of Cartesian coordinates.

The mapping may relate rectangular [x,y] Cartesian coordinates to [u,v] mapped coordinates by the relations:

$$x = \frac{u}{u^2 + v^2}$$
$$y = \frac{v}{u^2 + v^2}.$$

The inversion may relate rectangular [x,y] Cartesian coordinates to [u,v] mapped coordinates by the relations:

$$x = \frac{u}{u^2 + v^2}$$
$$y = \frac{v}{u^2 + v^2} - \frac{2}{v}.$$

Other than interiors of the plurality of cells, the metamaterial may comprise at least one of: i) metal; ii) plastic; iii) composite. Interiors of at least a majority of the plurality of cells, possibly including all the cells, may comprise a non-metallic material. Interiors of at least a majority of the plurality of cells, possibly including all the cells, may substantially comprise a vacuum. For at least a majority of the plurality of cells, possibly including all the cells, each cell may be a column oriented transverse to a direction of travel of the acoustic signals. The metamaterial may be configured to display a substantially unbounded ultrasonic attenuation frequency bandwidth with respect to absorption of incident acoustic energy waves. At least a majority of the at least one sub-cell, possibly including all the sub-cells, may comprise a non-solid. The at least one vibration attenuator may be configured to dynamically isolate the vibration source via broad-band attenuation.

Method embodiments may include positioning at least one vibration attenuator configured to dynamically isolate the vibration source, the at least one acoustic attenuator comprising metamaterial defining a plurality of cells; wherein at least one cell of the plurality of cells comprises a plurality of sub-cells azimuthally arrayed about an axis of alignment, at least one sub-cell of the plurality defined by a solid, the at least one sub-cell including a plurality of cell segments substantially oriented in alignment with a mapping geometry comprising an inversion of a canonical tangent circles mapping.

Methods may include dissipating energy of noise producing vibrational waves propagating from the vibration source by focusing the vibrational waves to an interior of at least some of the at least one cell. The energy may be dissipated at least in part by subwavelength wave scattering at the metamaterial intercellular boundaries. The at least one vibration attenuator may cause hyperabsorption of the noise producing vibrational waves. Methods may include receiving an acoustic signal responsive to acoustic waves comprising information relating to the volume of interest; and using the information to estimate a parameter of interest. Methods may include using the estimated parameter of interest to perform further borehole operations.

In aspects, the present disclosure provides an apparatus for investigating a subsurface volume. The apparatus may include an enclosure configured to be conveyed along a wellbore, an acoustic transducer disposed in the enclosure and generating acoustical signals, an electronics assembly disposed in the enclosure and controlling the acoustic transducer, and a receiver.

Other apparatus embodiments may include an enclosure configured for conveyance along the borehole; an acoustic source in the enclosure configured to generate acoustic signals; at least one receiver in the enclosure configured to receive acoustic signals; at least one broad-band acoustic attenuator positioned between the acoustic transmitter and the at least one receiver in the enclosure, each of the at least one acoustic attenuator comprising a metamaterial defining a plurality of cells; wherein each cell comprises a plurality of sub-cells azimuthally arrayed about an axis of alignment, each sub-cell comprising a plurality of cell segments with each cell segment of the plurality comprising at least one arcuate section and at least one radial section, and wherein the cell segments of each sub-cell are oriented in alignment with a mapping geometry comprising an inversion of a canonical tangent circles mapping in a plane transverse to the axis of alignment.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 3A & 3B illustrate example metamaterial cells with cell segments oriented in alignment with an inversion of a canonical tangent circles mapping for attenuating an acoustic wave in accordance with the present disclosure;

DETAILED DESCRIPTION

Figure 1:
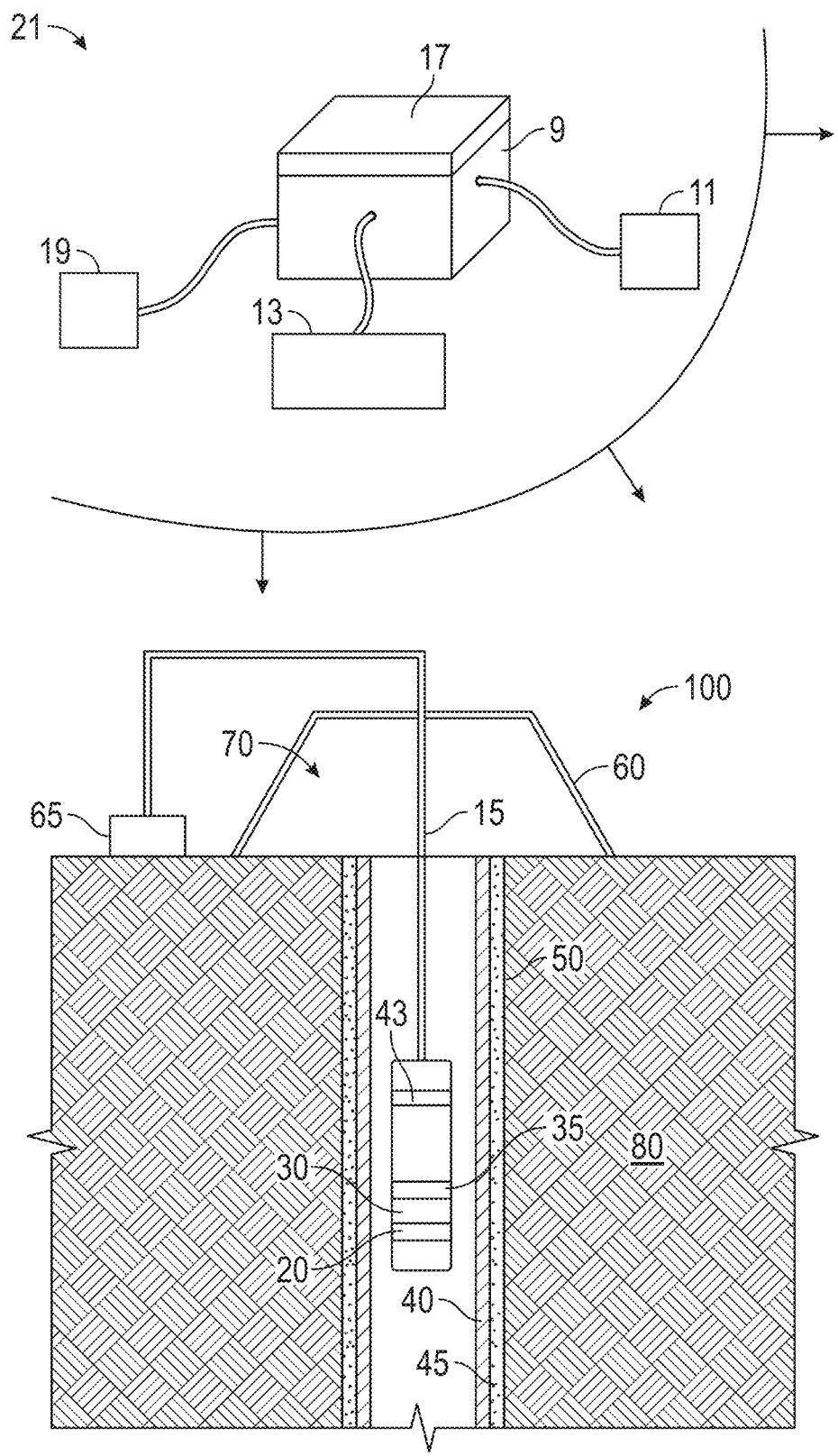
FIG. 1 schematically illustrates a downhole acoustic logging system in accordance with the present disclosure.

Aspects of the present disclosure include apparatus, systems, and methods for vibration attenuation. Aspects of the present disclosure may include apparatus, systems, and methods for investigating a subsurface volume of interest from a borehole. System embodiments may include a vibration attenuation system, comprising: at least one vibration attenuator configured to dynamically isolate a vibration source, the at least one vibration attenuator comprising metamaterial defining a plurality of cells; wherein at least one cell of the plurality of cells comprises a plurality of sub-cells azimuthally arrayed about an axis of alignment, and at least one sub-cell of the plurality is defined by a solid, the at least one sub-cell including a plurality of cell segments substantially oriented in alignment with a mapping geometry comprising an inversion of a canonical tangent circles mapping.

Aspects of the present disclosure include a broad-band acoustic attenuator comprising a metamaterial defining a plurality of cells. The cells of the metamaterial may intrinsically damp incident acoustic waves. Each cell may focus acoustic waves incident on the cell to an interior of the cell where energy of the acoustic waves is dissipated by absorption. Absorption frequency dispersion may exhibit a hyperbolic response and affect all (spatial) frequencies of propagation.

The metamaterial may be a bulk material with vibration attenuation characteristics associated with physical phenomena resulting in very broad-band vibratory (e.g., acoustic) attenuation characteristics by absorption of incident dynamic energy waves. The absorption characteristics may be brought about by energy transfer within the material to dissipate vibrational (e.g., acoustic) energy. Both 2D acoustical simulations and frequency dispersion analyses concluded that the attenuation mechanism is related to absorption behavior as opposed to simple reflection. The energy of an incident acoustic wave appears to be focused to the interior of the cell structure and dissipated there by absorption created from macroscopic cell boundary scattering. The absorption frequency dispersion was determined to exhibit a hyperbolic response and affected all (spatial) frequencies of propagation. In aspects, additive manufacturing processes may be employed to embed the material intrinsically within a tool or tool components with inherent hyperabsorption characteristics.

Each cell comprises a plurality of sub-cells azimuthally arrayed about an axis of alignment. Each sub-cell comprises a plurality of cell segments with each cell segment of the plurality comprising at least one arcuate section and at least one radial section, wherein the cell segments of each sub-cell are oriented in alignment with a mapping geometry comprising an inversion of a canonical tangent circles mapping in a plane transverse to the axis of alignment.

Aspects of the present disclosure include apparatus for enhanced broad-band acoustic attenuation. Techniques are disclosed herein for acoustic attenuation using a metamaterial comprised of cells comprising a plurality of sub-cells. One example described herein is that of using a canonical tangent circles transformation in which a canonical tangent circles mapping forms the sub-cell geometry. The mapping focuses constant contours of eccentric circles with a common tangent point at the origin of Cartesian coordinates. The rectangular [x,y] Cartesian coordinates may be related to the [u,v] mapped coordinates by the relations:

$$x = \frac{u}{u^2 + v^2}$$  Eq. (1)
$$y = \frac{v}{u^2 + v^2}.$$

The inversion relates rectangular [x,y] Cartesian coordinates to [u,v] mapped coordinates by the relations:

$$x = \frac{u}{u^2 + v^2}$$  Eq. (2)
$$y = \frac{v}{u^2 + v^2} - \frac{2}{v}.$$

Figure 2A:
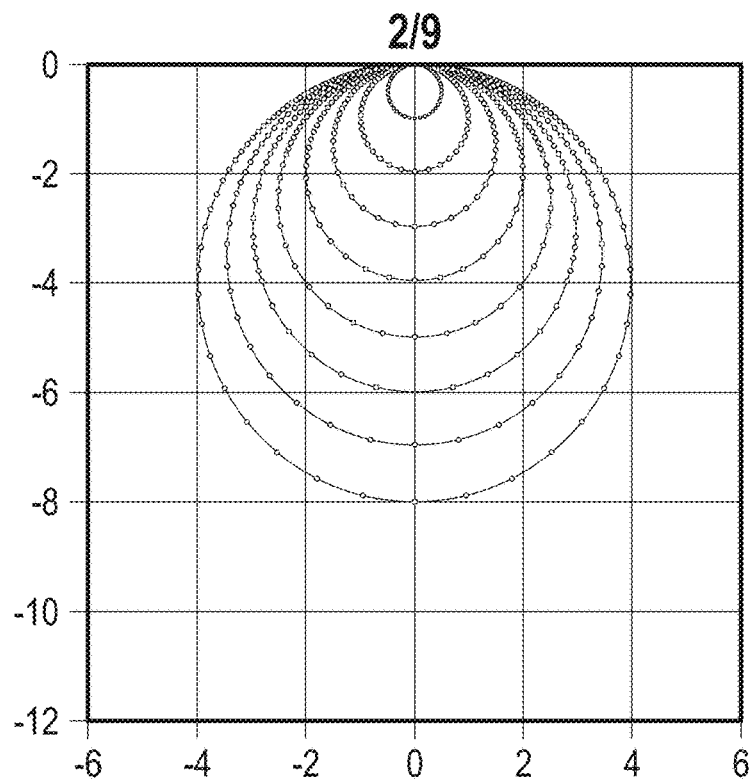
FIGS. 2A & 2B illustrate the mapping geometry in accordance with the present disclosure.
Figure 2B:
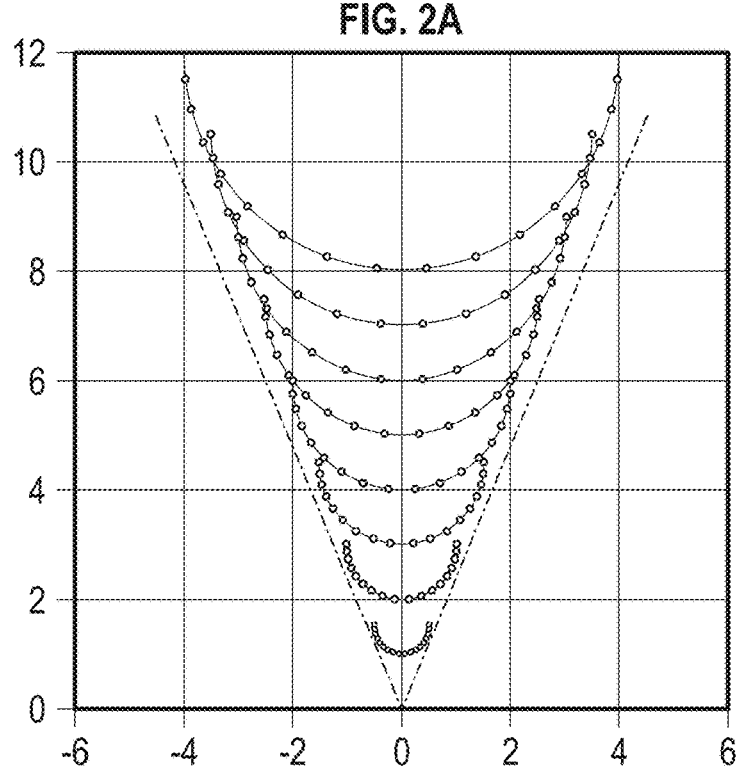

FIGS. 2A & 2B illustrate the mapping geometry. FIG. 2A shows tangent circles curvilinear contours. FIG. 2B shows inverted tangent circles curvilinear contours. Eq. (1) develops focusing constant contours of eccentric circles with a common tangent point at the origin of Cartesian coordinates as shown in FIG. 2A. The inversion of this mapping according to the relations of Eq. (2) is used to obtain the defocusing constant contours of eccentric circles, shown in FIG. 2B. The physical cell design is developed with the inversion constant coordinate contours in FIG. 2B as a sub-cell template for octagonal symmetry in the sub-cell geometry. In contrast to other novel cells, such as the cells used in acoustic transmission (which include a solid material such as a metal arrayed in a fluid background), aspects of the present disclosure include cells comprised of a fluid medium arrayed in a solid (e.g., metallic) background.

In aspects, additive manufacturing processes may be employed to embed the material intrinsically within a tool or tool components with inherent hyperabsorption characteristics. See also, Patent Cooperation Treaty application filed as U.S. Patent Application Ser. No. 2015/044467 to Weisman et al filed Aug. 10, 2014, and published as WO 2016025388 A1.

For the manufacture of metal-based materials, additive manufacturing powder bed systems (such as selective laser melting (SLM), metal 3D printing, laser cusing, electron beam melting (EBM), and direct metal laser sintering (DMLS)) or powder fed systems (such as laser cladding, directed energy deposition, and laser metal deposition) may be employed. Example commercial systems which are suitable for manufacture include the Laser Engineered Net Shaping (LENS) powder delivery system from Optomec, and Studio System+ from Desktop Metal of Burlington, Mass. For plastic materials, filament-based 3D printing techniques, such as fused deposition modeling, may be employed in manufacture. 3D printer filaments may include PLA and ABS and may contain metal powder.

In aspects, the present disclosure relates to acoustic devices and related methods for investigating a subterranean volume of interest of an earth formation from a borehole in the formation. General apparatus embodiments described herein include at least one acoustic transmitter and at least one acoustic receiver. Either or both of the transmitter(s) and receiver(s) may include a lens assembly being which may also be formed of a plurality of cells of another cell type which may cause acoustic waves to travel at a different speed in each of three orthogonal directions.

Embodiments may include using at least one acoustic sensor to produce acoustic information responsive to an acoustic wave from the cement annulus. In some implementations, the same transducer may serve as both transmitter and receiver. The information is indicative of a parameter of interest. The term "information" as used herein includes any form of information (analog, digital, EM, printed, etc.), and may include one or more of: raw data, processed data, and signals.

Methods may include estimating a parameter of interest from the information and performing further borehole operations in dependence upon the evaluation or the parameter of interest. In particular embodiments, a state of drilling operations, characteristics of the borehole, casing, cement, or formation, or a bond between cement and casing, may be estimated using the parameter of interest, and then used in performing an operation as described above.

FIG. 1 schematically illustrates a downhole acoustic logging system 100 having a downhole tool 10 configured to acquire information using at least one acoustic transmitter 35 and at least one acoustic receiver 20, while in a borehole 50 in an earth formation 80 and estimate a parameter of interest. The at least one acoustic transmitter 35 and at least one acoustic receiver 20 are separated by at least one broad-band acoustic attenuator 30. The parameter of interest may relate to properties of the casing 40 or cement 45 within the borehole 50, or characterization of the bond between them.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

A surface control system 65 receives signals from receiver 20 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 43 at a suitable location on downhole tool 10. The surface control system 65 may process data relating to the operations and data from the receiver 20 and may control one or more downhole operations performed by system 100 in dependence upon the received signals.

In one embodiment, electronics associated with sensor transmitter(s) 35 and receiver(s) 20 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the sensor(s). Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user. Information may also be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers, described in further detail below, may be configured to take measurements at a plurality of azimuthal orientations as the tool moves along the longitudinal axis of the borehole ('axially') using sensor 40. These measurements may be substantially continuous, which may be defined as being repeated at very small increments of depth and azimuth, such that the resulting information has sufficient scope and resolution to provide an image of borehole parameters (e.g., acoustic properties of the fluid in and formation at the borehole) or parameters relating to casing, cement, or the bond between them (collectively, "downhole parameters").

In other embodiments, electronics may be located elsewhere (e.g., at the surface, or remotely). To perform the treatments during a single trip, the tool may use a high bandwidth transmission to transmit the information acquired by receiver 20 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

A surface control system or downhole control system may be configured to control the tool described above and any incorporated sensors and to estimate a parameter of interest according to methods described herein. Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 3C:
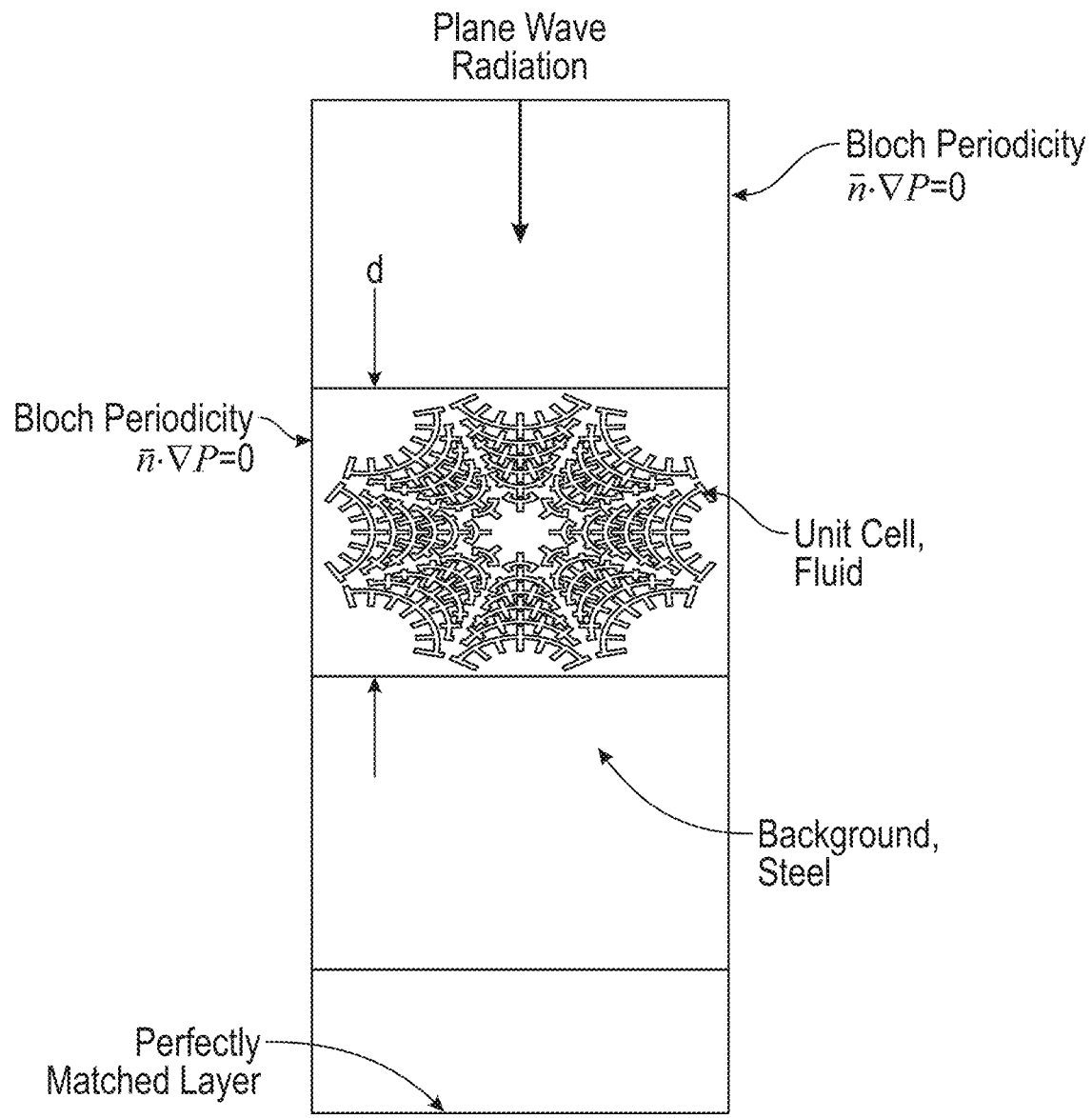
FIG. 3C illustrates a simulation model and boundary conditions for the metamaterial.

FIGS. 3A-3C illustrate example metamaterial cells with cell segments oriented in alignment with an inversion of a canonical tangent circles mapping for attenuating an acoustic wave in accordance with the present disclosure. FIG. 3A shows sub-cell inversion of tangents mapping contours. FIG. 3B shows isotropic cell geometry.

FIG. 3B illustrates the cell 310. The cell 310 has two opposing planar surfaces that are parallel. As illustrated, the visible planar surface 313 is parallel with the paper. The distance between the two surfaces, or thickness, may be in the range of 1 millimeter to 100 millimeters. The diameter of a circle enclosing the cell 310 may be in the range of 1 millimeter to 50 millimeters. These dimensions are generally selected to allow phenomena such as resonances to have a measurable influence on the behavior of the cell 310 and affect wave manipulation in the particular frequency ranges of interest. The cells, such as cell 310, of the present disclosure may be made up of reservoirs or wells 303 formed of liquid. The wells 303 are defined by surfaces or walls 305 of a solid, e.g., metals or non-metals. Suitable metals include, but are not limited to, steel, platinum, tungsten, gold, and exotic options such as iridium, with the important material property for acoustic wave attenuation being the mass density of the metal.

As shown in FIG. 3B, the cell 310 includes eight sub-cells 320. Although sub-cells are depicted as identical, in some applications, each sub-cell may be unique. In some implementations, one or more sub-cells may depart from the canonical mapping for cost, ease of manufacture, and so on. The curvilinear geometry of the segments 304 of cell 310 may be constructed from the set of sub-cell inversion of tangents mapping contours 301 with [x, y] coordinates located within an eight sub-cell cell of the Cartesian frame such that for each sub-cell the segments 304 align with the set of contours 301. Although an eight sub-cell cell is depicted, greater or less numbers of sub-cells may be employed for various design considerations. FIG. 3A illustrates the set 391 of contours 301. See P. Moon and D. E. Spencer, Field Theory Handbook, New York: Springer-Verlag, 1971.

The cells of the metamaterial intrinsically damp incident acoustic waves. Each cell focuses acoustic waves incident on the cell to an interior of the cell where energy of the acoustic waves is dissipated by absorption. This absorption may be predominantly due to subwavelength wave scattering at metamaterial intracellular boundaries.

The dissipation phenomena may display some similarities to damping from grain boundary scattering in conventional metals, except that the metamaterial absorption behaves with a hyperbolic frequency dispersion that develops an almost unbounded attenuation spatial frequency bandwidth; in other words, with "hyperabsorption."

The wells 303 may comprise a plurality of segments 304 with each segment of the plurality comprising at least one of an arcuate segment 350 comprising a curve corresponding to a contour line. The arcuate segments 350 may have offshoot segments, which may be radial segments 351 perpendicular to the tangent of the curve. The offshoot segments may be substantially rectangular, or may also have a curvature, which may also comport with the canonical mapping, alternative mapping, or may be random. Radial segments 351 and other offshoot segments may also have effects such as chamfering, bullnosing, or the like. The boundaries of the offshoot segments, including radial segments, may also be individually curved, textured, split, or the like. The cell segments may alternatively comprise air or other gases, or may consist of a vacuum. Other embodiments may include other types of segments in some or all of the sub-cells, for some or all of the cells, in dependence upon the particular application or design considerations, such as cost, ease of manufacture, and so on.

The resonances and anti-resonances within the cell 310 are affected by the interaction of the various structural features through the background medium or fluid-filled well described above. Thus, the number, size, shape, and orientation of features influence where and to what extent resonances and anti-resonances occur and how they complement or negate one another in affecting manipulation and control of the incident acoustic wave. Any number of segments may be used. Configuration may be carried out by building the cell—that is, iteratively adding design elements to the mapping. Each cell may be a column that is oriented transverse to a direction of travel of the acoustic signals.

FIG. 3C illustrates a simulation model and boundary conditions for the metamaterial. Other than interiors of the plurality of cells, the metamaterial may be metallic. To understand the fundamental acoustic attenuation characteristics of the cell design a series of detailed multi-physics finite element analyses were conducted to calculate the transmission frequency response spectra of a classic acoustical T-R waveguide problem.

The waveguide background material may have the acoustic properties of typical steel, or approximations thereof, and the cell material may approximate the acoustic properties of water. The waveguide longitudinal edges are constrained with Bloch periodic boundary conditions to simulate the effect of placement in a lattice array of identical cells. An harmonic acoustic plane wave radiation is placed to emanate from the top edge boundary of the waveguide and a perfectly matched layer is placed at the bottom of the waveguide to eliminate all reflections. The transmission and reflection coefficients are retrieved over a frequency range of 0-300 kHz, and the effective acoustic pentamode properties are extracted to calculate the effective frequency response spectra. See U.S. patent application Ser. No. 15/215,159. The resulting response spectra derived from the basic cell properties is shown in FIG. 4 (below) for a cell size of d=14.25 mm and an aspect ratio of 0.70.

Figure 4:
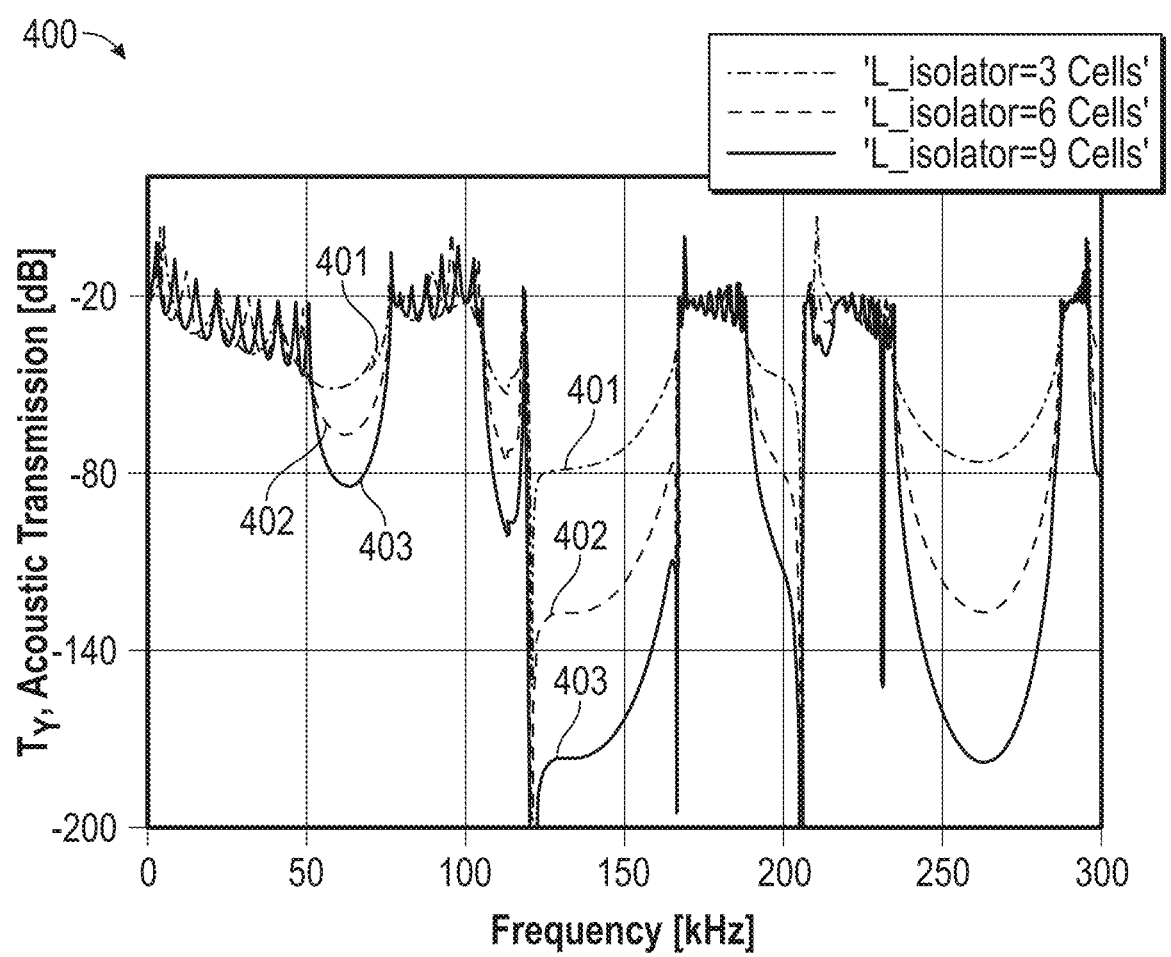
FIG. 4 illustrates elemental transmission spectra for various lens thicknesses.

FIG. 4 illustrates elemental transmission spectra for various lens thicknesses. The frequency response spectra 401, 402, 403 show the estimate of transmission of an incident plane wave in steel through a rectangular slab array of cells with infinite extent lateral to the wave propagation and various slab thickness of 3 cells (401), 6 cells (402), and 9 cells (403). The response spectra indicate that each of the thickness of metamaterial slab attenuates to variable magnitude over the entire frequency range to 300 kHz. The broadband attenuation threshold is 20 dB over the range for each slab thickness, while in certain frequency bandwidths the attenuation magnitude increases proportionately with metamaterial slab thickness. For a slab thickness of 9 cells the attenuation ranges between 20 dB to almost 200 dB. The simulation extends to 300 kHz but it is expected that similar attenuation characteristics extend well beyond this frequency (e.g., 1 MHz).

Figure 5A:
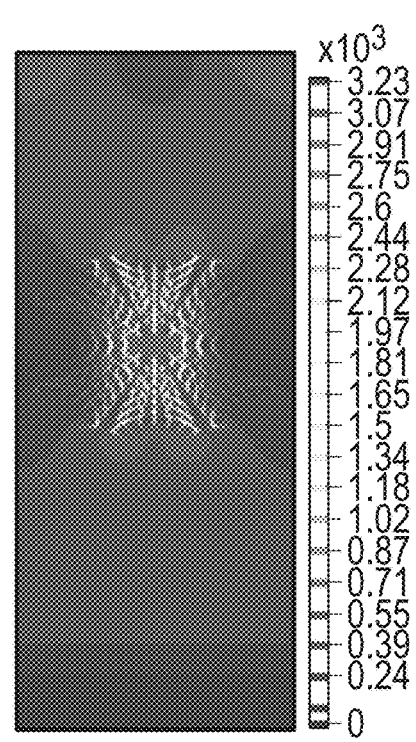
FIGS. 5A and 5B illustrate the wave propagation behavior at a representative frequency.
Figure 5B:
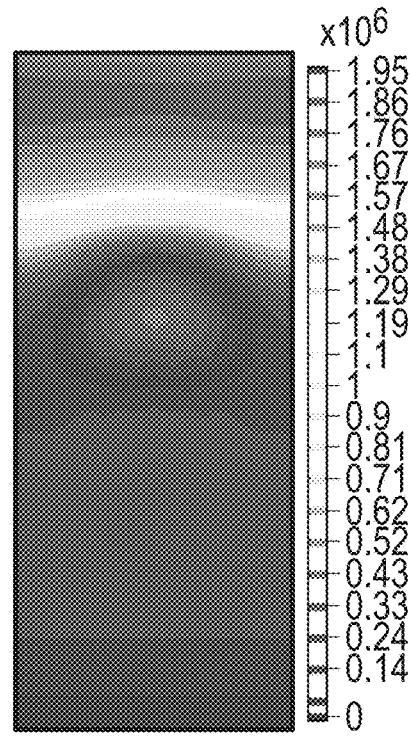
Figure 6:
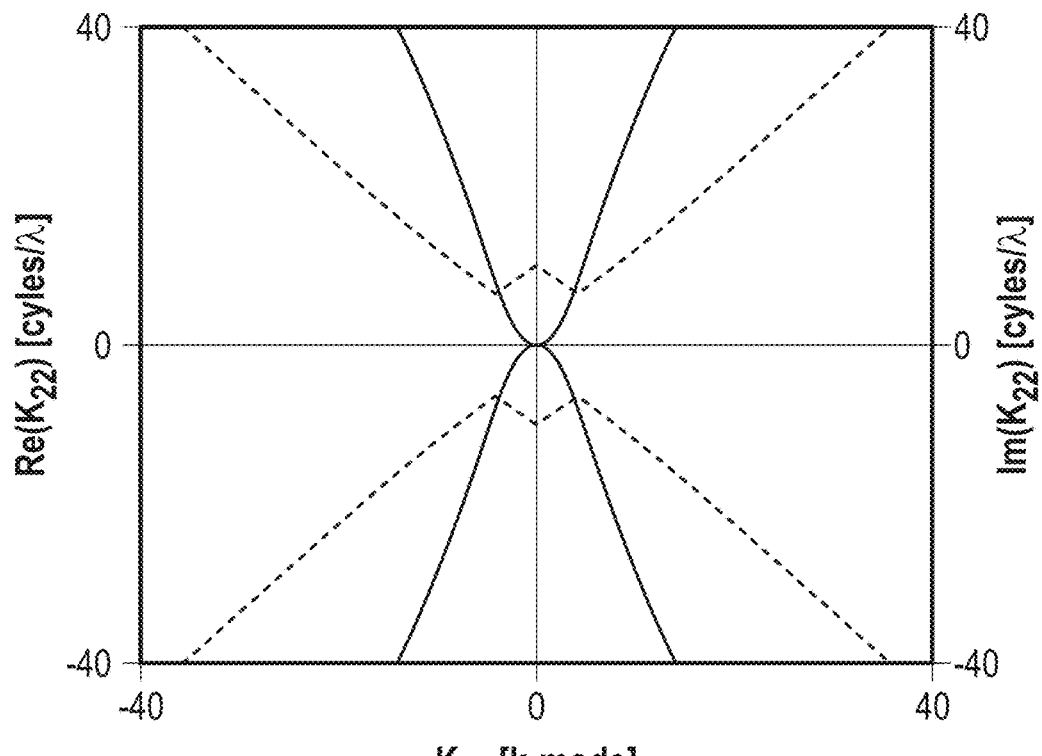
FIG. 6 shows fundamental cell frequency dispersion at 140 kHz.

FIGS. 5A and 5B illustrate the wave propagation behavior at one representative frequency. The wave propagation behavior provides insight into the attenuation mechanism of the metamaterial cell. FIG. 6 shows fundamental cell frequency dispersion at 140 kHz.

FIG. 5A shows the acoustic intensity response. FIG. 5B shows cell pressure magnitude wave response at 140 kHz. The incident pressure plane wave diminishes immediately when the wave encounters the cell zone. Referring to FIG. 5A, the predominant distribution of energy within the cell zone is indicative that attenuation is due to energy absorption (instead of reflection). The associated frequency dispersion plot of FIG. 6 further substantiates this premise, showing that the imaginary absorptive component of the wavenumber dominates the low (spatial) frequency propagation modes and exhibits a hyperbolic dispersion that continues to increase in the higher frequency modes.

The simulations described in greater detail with respect to FIGS. 5A, 5B & 6 provide significant information relative to the attenuation characteristics of the metamaterial cell design. However, each of the analyses was of a purely acoustical nature and did not account for the coupled elastic shear effects of the solid (metal) matrix material.

Figure 7A:
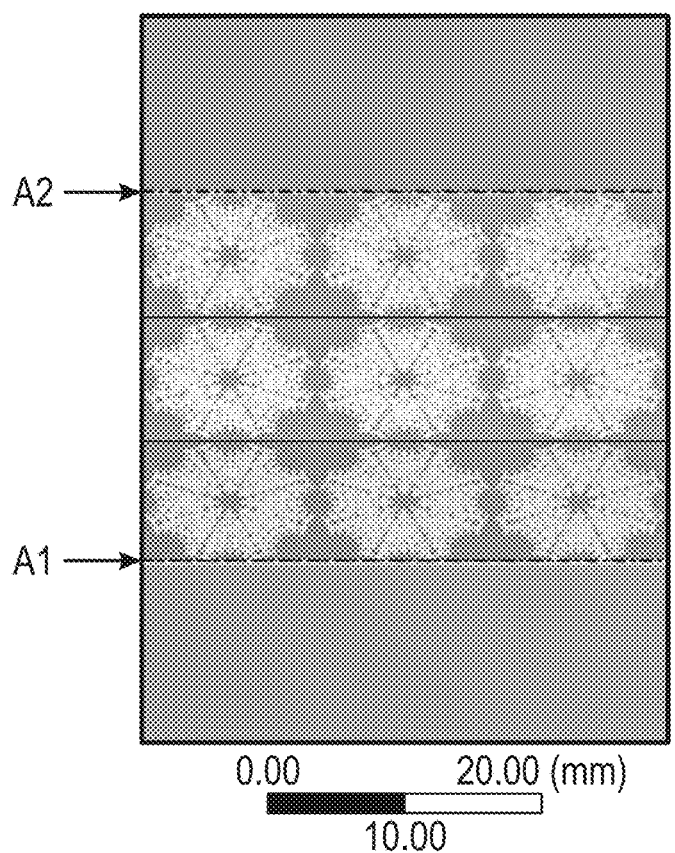
FIGS. 7A and 7B illustrate a three-dimensional simulation model of an elastic solid matrix.
Figure 7B:
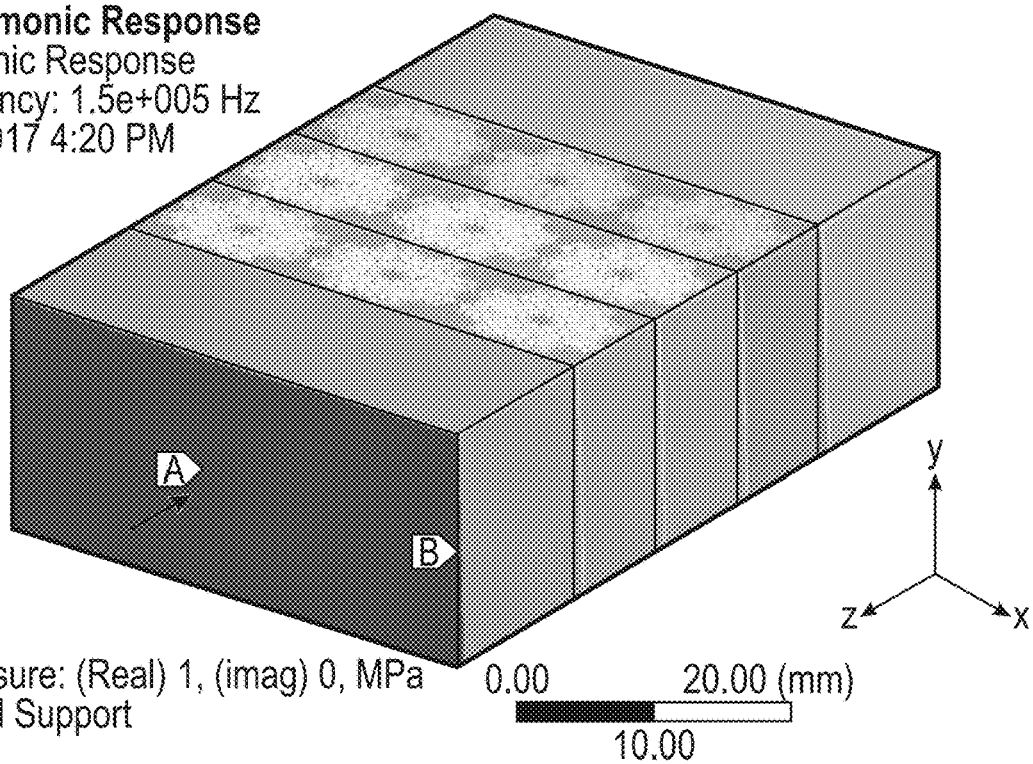

FIGS. 7A & 7B illustrate a three-dimensional simulation model of an elastic solid matrix. FIG. 7A shows a planar view of a nine-cell attenuator. FIG. 7B shows a perspective view of a nine-cell attenuator. The model of the simulation comprises a 3×3 array of metamaterial cells with incident and transmission solid block sections as shown in FIGS. 7A & 7B. The elastic solid material is steel and the cell interior is simply a vacuum. In other examples, the cell material may be air, water, or other fluids. The damping ratio used for the steel material is 2.5 percent. It is expected that results for the 3D multi-physics problem having a fluid of nonzero acoustic properties will exhibit more attenuation. So the results from the vacuum case are conservative. A uniform harmonic pressure is applied to the exterior face of the incident block section, with the motion of the edges of the incident block face constrained, for example, as one might have with a simple drumhead. All other boundaries are free. The input and output waves are calculated as the average acceleration over the face 'A1' and 'A2', respectively. The transmission transfer function is then calculated as $$F = -20 \log_{10}(A_2/A_1).$$

Figure 8:
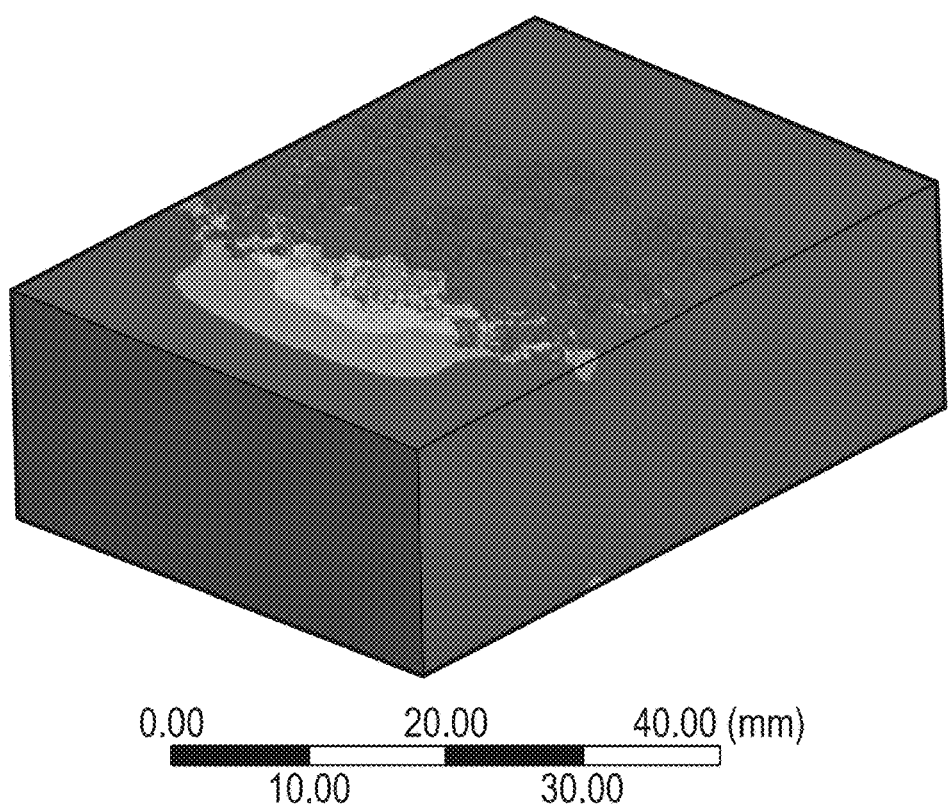
FIG. 8 shows a contour plot of a representative acceleration distribution response for 151 kHz.
Figure 9:
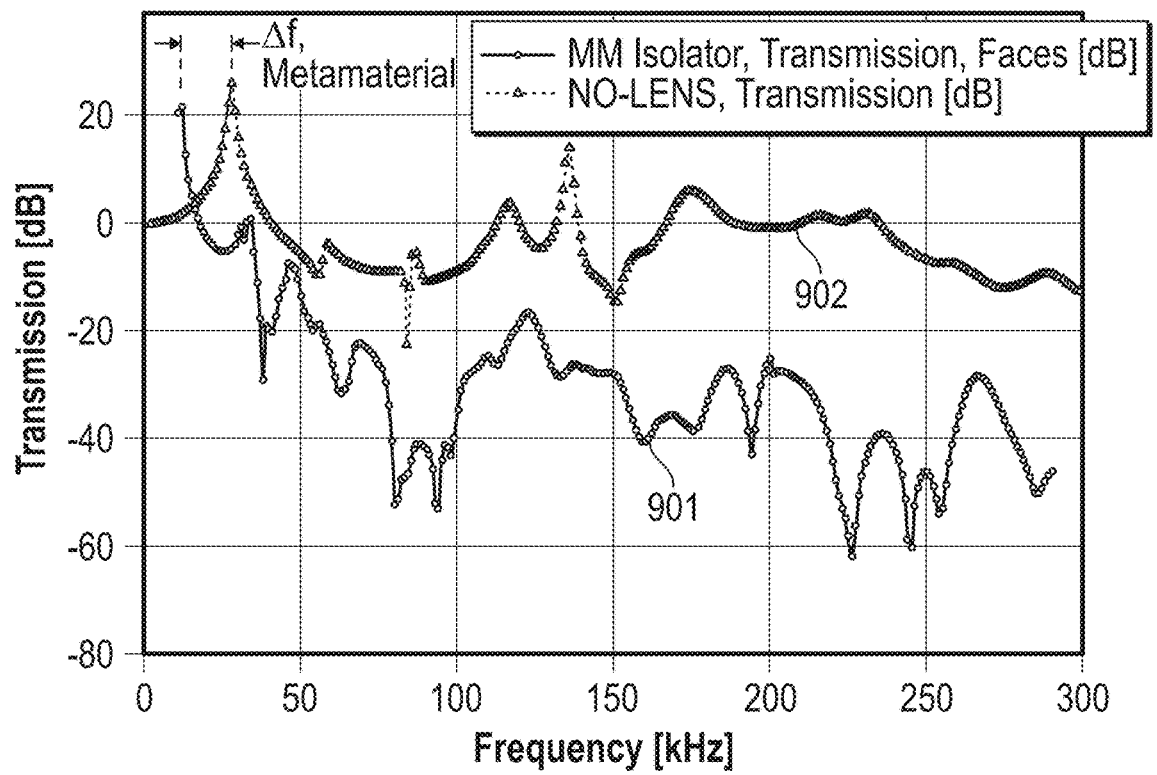
FIG. 9 shows a resulting transmission frequency response spectra for a cell size of d=14.25 mm and aspect ratio 0.70.

FIG. 8 shows a contour plot of a representative acceleration distribution response for 151 kHz. FIG. 9 shows the resulting transmission frequency response spectra for a cell size of d=14.25 mm and aspect ratio 0.70. The dimension of the 3×3 metamaterial array in the propagation direction is 30 mm. Superimposed on the metamaterial transmission spectrum is the associated transmission spectrum for the completely solid elastic bar with no metamaterial cells. The 3D simulation results show similar attenuation response characteristics as calculated from the closed-form pentamode relations for a 3-cell thickness slab, with greater than 20 dB attenuation extending over the entire range from about 35 kHz out to 300 kHz. Certain bandwidths exhibit attenuation levels of 50 dB and greater. The fundamental resonance mode of the elastic solid bar occurs at about 28 kHz and shifts down to about 12 kHz with the metamaterial. The initiation of the dark metamaterial regime appears to be dictated by the zero after the fundamental bar mode resonance pole.

The resonance frequency changes inversely proportionate to the length of the bar. As the length of the metamaterial array increases in the propagation direction, the attenuation levels will increase as well. So for practical tool designs in which the length of the metamaterial array is much greater than analyzed here, the dark (−20 dB) regime should initiate at much lower frequencies than 35 kHz, probably as low as ~5 kHz.

Figure 10:
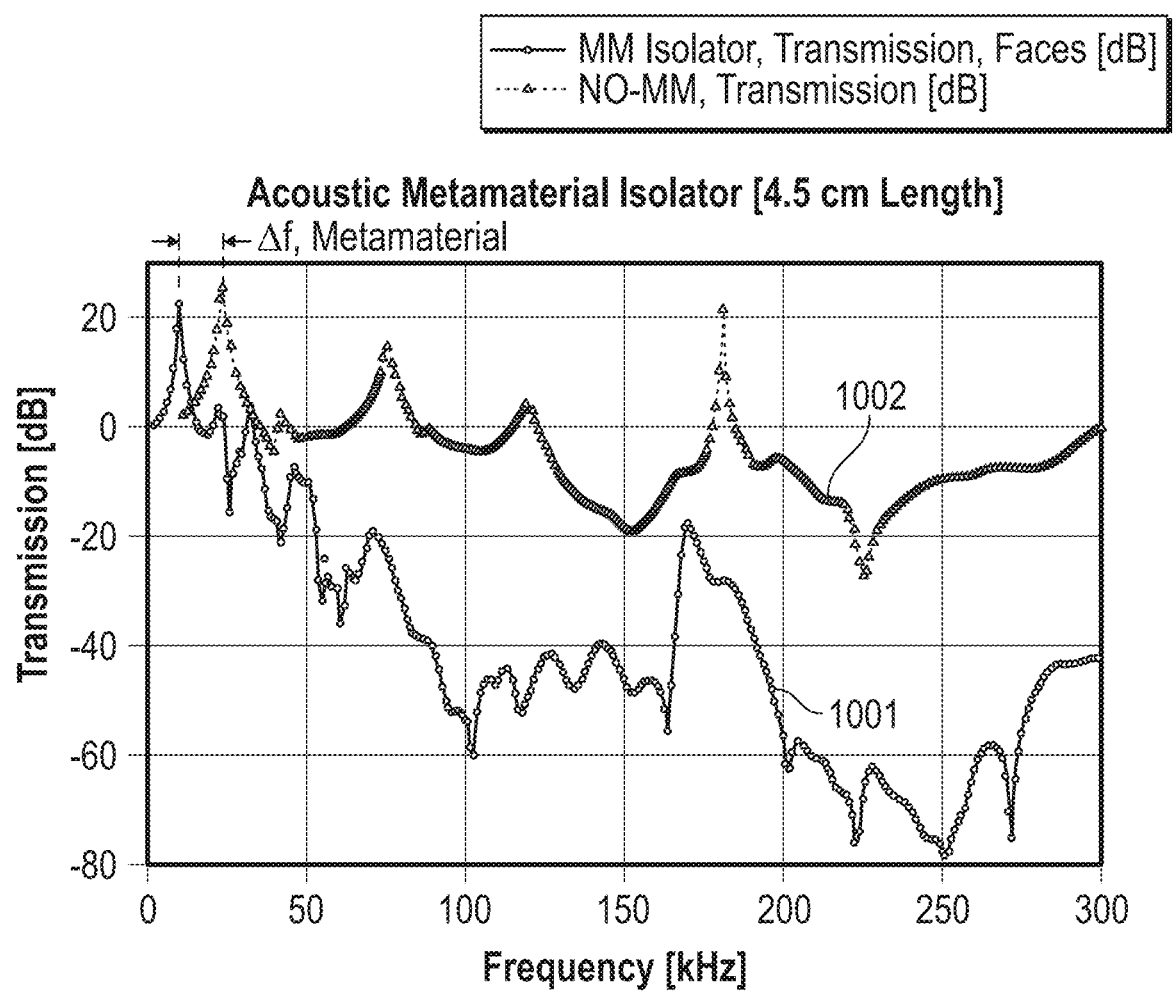
FIG. 10 shows a resulting transmission frequency response spectra for a cell size of d=21.38 mm and aspect ratio 0.70.

FIG. 10 shows the resulting transmission frequency response spectra for a cell size of d=21.38 mm and aspect ratio 0.70. The dimension of the 3×3 metamaterial array in the propagation direction is 45 mm. Superimposed on the metamaterial transmission spectrum is the associated transmission spectrum for the completely solid elastic bar with no metamaterial cells. The 3D simulation results for the 21.38 mm cell size array show increased attenuation response characteristics in some bandwidths compared to the 14.25 mm cell size array. Certain bandwidths exhibit attenuation levels of 70 dB and greater. The fundamental resonance mode of the elastic solid bar occurs at about 24 kHz and is shifted down to about 10 kHz with the metamaterial. Analogous to the smaller cell size results, the initiation of the dark metamaterial regime is dictated by the zero after the fundamental bar mode resonance pole.

While the present disclosure is discussed in the context of a hydrocarbon producing well, it should be understood that the present disclosure may be used in any borehole environment (e.g., a water or geothermal well). Also, embodiments may be used in acoustic tools used at the surface or in bodies of water. Vibration isolation via employment of the present techniques may also be extended to vibratory isolation of any type of dynamic source, such as with industrial machinery, automobiles, aircraft, other vehicles, and the like. All methods, systems, and devices in accordance with the techniques of the present disclosure are explicitly adopted here.

A metamaterial is a material engineered to have a property that is not found in nature. "Conformal mapping geometry," as used herein, refers to an arrangement of cell segments within the cell such that the contour lines from a non-Cartesian coordinate system are mapped onto a surface. Herein the surface may be a flat base from which each cell projects in a cantilever fashion. "Unbounded" as used herein describes a frequency range including normal operating frequencies for downhole ultrasonic (e.g., less than 1 MHz). "Non-solid" as defined herein refers to a liquid, gas, vacuum, dissolved and/or suspended particulate matter, admixtures, solutions, emulsions, suspensions, or combinations of these. "Dynamically isolate," as used herein, means to mitigate transfer of vibratory motion across by vibratory decoupling.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. A vibration attenuation system, comprising:
at least one vibration attenuator configured to dynamically isolate a vibration source, the at least one vibration attenuator comprising metamaterial defining a plurality of cells;
wherein at least one cell of the plurality of cells comprises a plurality of sub-cells azimuthally arrayed about an axis of alignment, at least one sub-cell of the plurality defined by a solid, the at least one sub-cell including a plurality of cell segments substantially oriented in alignment with a mapping geometry comprising an inversion of a canonical tangent circles mapping.

2. The vibration attenuation system of claim 1, wherein the at least one sub-cell includes a plurality of cell segments with at least a majority of cell segments of the plurality comprising at least one arcuate section and at least one radial section.

3. The vibration attenuation system of claim 1, wherein the vibration source comprises an acoustic source, the system further comprising the acoustic source and at least one receiver configured to receive acoustic signals caused by the acoustic source.

4. The vibration attenuation system of claim 3, comprising an enclosure configured for conveyance along a borehole, the enclosure having the acoustic source and the at least one receiver disposed therein; wherein the at least one acoustic attenuator is positioned between the acoustic source and the at least one receiver in the enclosure.

5. The vibration attenuation system of claim 3, wherein the at least one receiver is configured to receive acoustic signals resulting from an interaction of a volume of interest with acoustic source signals generated from the acoustic source.

6. The vibration attenuation system of claim 1, wherein at least a majority of cell segments of the plurality each comprise a plurality of arcuate sections.

7. The vibration attenuation system of claim 1, wherein the canonical tangent circles mapping provides focusing constant contours of eccentric circles with a common tangent point at the origin of Cartesian coordinates, and the inversion provides defocusing constant contours of the eccentric circles.

8. The vibration attenuation system of claim 1, wherein the cells of the metamaterial intrinsically damp incident acoustic waves.

9. The vibration attenuation system of claim 1, wherein at least some cells of the at least one cell focus incident acoustic waves to a cell interior where energy of the incident acoustic waves is dissipated by absorption.

10. The vibration attenuation system of claim 9, wherein the absorption is predominantly due to subwavelength wave scattering at metamaterial intracellular boundaries.

11. The vibration attenuation system of claim 9, wherein the absorption occurs over a substantially unbounded attenuation frequency bandwidth.

12. The vibration attenuation system of claim 1, wherein the mapping focuses constant contours of eccentric circles with a common tangent point at the origin of Cartesian coordinates.

13. The vibration attenuation system of claim 12, wherein the mapping relates rectangular [x,y] Cartesian coordinates to [u,v] mapped coordinates by the relations:

$$x = \frac{u}{u^2 + v^2}$$

$$y = \frac{v}{u^2+v^2}.$$

14. The vibration attenuation system of claim 12, wherein the inversion relates rectangular [x,y] Cartesian coordinates to [u,v] mapped coordinates by the relations:

$$x = \frac{u}{u^2+v^2}$$
$$y = \frac{v}{u^2+v^2} - \frac{2}{v}.$$

15. The vibration attenuation system of claim 1, wherein, other than interiors of the plurality of cells, the metamaterial comprises at least one of: i) metal; ii) plastic; iii) composite.

16. The vibration attenuation system of claim 15, wherein interiors of at least a majority of the plurality of cells comprises a non-metallic material.

17. The vibration attenuation system of claim 15, wherein interiors of at least a majority of the plurality of cells substantially comprise a vacuum.

18. The vibration attenuation system of claim 1, wherein for at least a majority of the plurality of cells, each cell is a column oriented transverse to a direction of travel of the acoustic signals.

19. The vibration attenuation system of claim 1, wherein the metamaterial is configured to display a substantially unbounded ultrasonic attenuation frequency bandwidth with respect to absorption of incident acoustic energy waves.

20. The vibration attenuation system of claim 1, wherein at least a majority of the at least one sub-cell comprises a non-solid.

21. The vibration attenuation system of claim 1, wherein the at least one vibration attenuator is configured to dynamically isolate the vibration source via broad-band attenuation.

22. A method for isolating a vibration source, comprising:
positioning at least one vibration attenuator configured to dynamically isolate the vibration source, the at least one acoustic attenuator comprising metamaterial defining a plurality of cells wherein at least one cell of the plurality of cells comprises a plurality of sub-cells azimuthally arrayed about an axis of alignment, at least one sub-cell of the plurality defined by a solid, the at least one sub-cell including a plurality of cell segments substantially oriented in alignment with a mapping geometry comprising an inversion of a canonical tangent circles mapping; and
dissipating energy of noise producing vibrational waves propagating from the vibration source by focusing the vibrational waves to an interior of at least some of the at least one cell.

23. The method of claim 22, wherein the energy is dissipated at least in part by subwavelength wave scattering at the metamaterial intercellular boundaries.

24. The method of claim 22, wherein the at least one vibration attenuator causes hyperabsorption of the noise producing vibrational waves.

\* \* \* \* \*